(12) United States Patent
Cannon et al.

(10) Patent No.: US 6,519,327 B1
(45) Date of Patent: Feb. 11, 2003

(54) SYSTEM AND METHOD FOR SELECTIVELY RETRIEVING MESSAGES STORED ON TELEPHONY AND DATA NETWORKS

(75) Inventors: Thomas Calvin Cannon, Bedminster, NJ (US); Geoffrey Allen Collyer, New Providence, NJ (US); Paul C. Lustgarten, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/363,928

(22) Filed: Jul. 30, 1999

(51) Int. Cl.[7] .................................................. H04M 1/64

(52) U.S. Cl. ................. 379/88.22; 379/67.1; 379/93.24

(58) Field of Search .............................. 379/67.1, 88.12, 379/88.13, 88.14, 88.16, 88.17, 88.18, 88.19, 88.22, 88.23, 88.24, 88.25, 88.27, 93.24, 93.26

(56) References Cited

U.S. PATENT DOCUMENTS

| | | | | |
|---|---|---|---|---|
| 5,506,885 A | * | 4/1996 | Hamilton | 379/283 |
| 5,719,922 A | * | 2/1998 | Bremer et al. | 379/88.13 |
| 5,889,839 A | * | 3/1999 | Beyda et al. | 379/88.12 |
| 5,987,100 A | * | 11/1999 | Fortman et al. | 379/88.14 |
| 5,991,365 A | * | 11/1999 | Pizano et al. | 379/88.13 |
| 6,023,700 A | * | 2/2000 | Owens et al. | 455/412 |
| 6,052,442 A | * | 4/2000 | Cooper et al. | 379/88.19 |
| 6,075,844 A | * | 6/2000 | Golberg et al. | 379/88.04 |
| 6,175,858 B1 | * | 1/2001 | Bulfer et al. | 709/206 |
| 6,233,318 B1 | * | 5/2001 | Picard et al. | 379/88.12 |
| 6,333,973 B1 | * | 12/2001 | Smith et al. | 379/67.1 |

* cited by examiner

Primary Examiner—Fan Tsang
Assistant Examiner—Ovidio Escalante
(74) Attorney, Agent, or Firm—Jean Marc Zimmerman

(57) ABSTRACT

A system and method for selectively retrieving voice-mail and electronic mail messages from a plurality of message storage devices residing on a telephony network and a data network and storing such retrieved messages in a common message storage device from which the retrieved messages can be accessed, edited and deleted.

16 Claims, 2 Drawing Sheets

SYSTEM AND METHOD FOR SELECTIVELY RETRIEVING MESSAGES STORED ON TELEPHONY AND DATA NETWORKS

FIELD OF THE INVENTION

This invention relates to message retrieval systems, and more particularly to a system for selectively retrieving different types of messages from message storage devices residing on both telephony networks and data networks.

BACKGROUND OF THE INVENTION

Message storage devices, such as telephone answering machines which store voice messages (voice-mail) received over a telephony network and electronic mailboxes which store electronic messages (e-mail) received over a data network, are widely used today by individuals, businesses, governments and educational institutions. To retrieve all of their messages, an individual must typically check each different type of message storage device they have. For example, an individual might have to check their business answering machine/voice-mail and computer for voice-mail and e-mail messages, check their wireless message mailbox for cellular voice-mail messages, and check their home answering machine for voice-mail messages.

Having to check a plurality of message storage devices to retrieve messages is both time consuming and inconvenient In addition, doing so results in lost productivity since time that could be spent working or performing other useful activities is instead spent retrieving messages from such devices. Moreover, having to check a plurality of devices to retrieve messages can delay when an individual receives such messages since they may inadvertently fail to check all such devices.

Conventional unified message systems have helped to alleviate the foregoing problem by enabling different types of messages, such as voice-mail and e-mail messages, which are stored on a plurality of data network-based message storage devices to be retrieved and then stored on a single device. Such systems, however, suffer from a significant drawback. Specifically, they are unable to retrieve messages stored on telephony network-based message storage devices, such as home answering machines and office answering machines.

SUMMARY OF THE INVENTION

A system and method for retrieving different types of messages from both telephony networks and data networks and storing such messages in a common message storage device where they can be accessed and edited.

DETAILED DESCRIPTION OF THE PREFERRED EMBODIMENT

Figure 1:
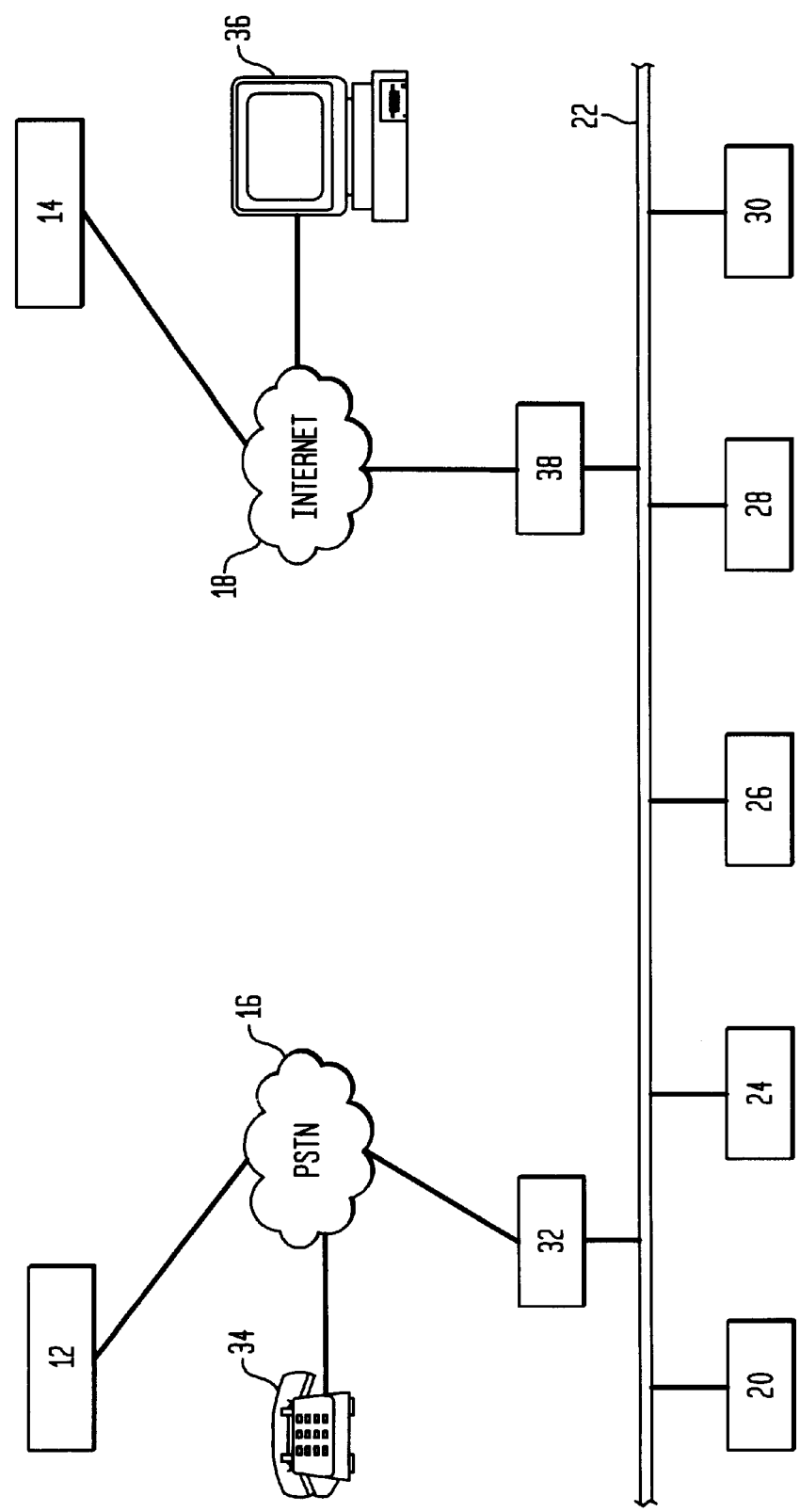
FIG. 1 shows an exemplary embodiment of a system according to the present invention for retrieving messages both from message storage devices residing on telephony-based and data-based networks and then storing the messages on a single message storage device.

FIG. 1 shows an exemplary embodiment of a system 10 for automatically and selectively retrieving messages from message storage devices 12 and 14 residing on a telephony network 16, such as a public switch telephone network (PSTN), and on a data network 18, such as an Internet, respectively, and then storing such retrieved messages in a common message storage device 20. As more fully described below, system 10 utilizes a plurality of devices which are networked together along a time division multiplexing bus 22 to retrieve and store such messages. System 10 enables an individual to check a single device using either a telephone or a computer to retrieve all of their messages, irrespective of the type of message stored, i.e., voice-mail or e-mail, and irrespective of the type of device on which such messages are originally stored, i.e., home answering machine, wireless voice mailbox, or computer electronic mailbox.

Interrogation server 24 has software agents stored thereon which are used both to communicate with and to issue interrogation commands to retrieve stored messages from telephony network 16 and data network 18. Speech processing server (SPS) 26 provides speech processing algorithms which enable the software agents on server 24 to recognize and record human speech and retrieve voice messages form message storage devices 12 and 14 residing on telephony network 16 and data network 18, respectively. The processing algorithms provided by SPS 26 include an automatic speech recognition (ASR) algorithm for converting human speech to text, a text-to-speech (TTS) algorithm for converting text to human speech, a Dual Tone Multiple Frequency (DTMF) algorithm for detecting and generating telephone dial tones, and an echo cancellation algorithm for interrupting the playing of prompts.

The plurality of messages are retrieved form the message storage devices 12 and 14 at a predetermined time. The plurality of messages are retrieved from the message storage devices 12 and 14 at a predetermined frequency.

Buffer server 28 deletes both extraneous leading and trailing prompts and pauses from messages retrieved by interrogation server 24. Message Transfer Agent (MTA) server 30 copies the messages edited by buffer server 28 and then stores such edited messages on common message storage device 20. Users can then access and further edit such messages using Voice User Interface (VUI) 32 in conjunction with SPS 26. Although devices 20, 24, 26, 28 and 30 can all reside on a single machine, they are depicted separately in the embodiment shown in FIG. 1 to simplify the description of system 10.

Figure 2:
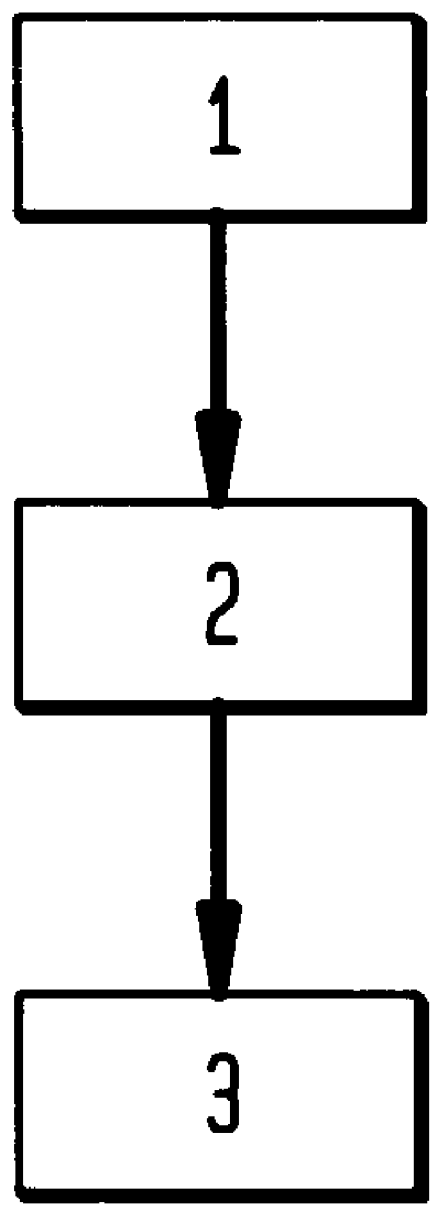
FIG. 2 shows a flowchart depicting the operation of the present invention.

FIG. 2 shows a flowchart depicting the operation of system 10 for retrieving a message from message storage device 12 residing on telephony network 16. At step 1, interrogation server 24 dials the telephone number for telephone 34 in order to access and interrogate via VUI 32 message storage device 12 that is associated with telephone 34. Alternatively, interrogation server 24 dials the number to directly access via VUI 32 a particular message storage device that resides on telephony network 16. When message storage device 12 answers the call, server 24 issues interrogation commands to retrieve unread messages stored thereon using the private code with which message storage device 12 was programmed by its owner/user.

The interrogation commands are comprised of a sequence of tones, spoken words or a combination of both that are selected by the user and which can vary for different types of message storage devices. The software agents include an energy level detection algorithm, a tone detection algorithm, and an ASR algorithm which both mimic the actions of the user in issuing such commands and depending upon the type of message storage device are selectively played at the appropriate time either in response to prompts from the message storage device or while the message storage device is playing its greeting. The commands are pre-programmed into interrogation server 24, which can also be programmed to retrieve messages at any particular time and as often as desired.

At step 2, system 10 parses the message stored on message storage device 12 using the energy level algorithm, tone detection algorithm and ASR algorithm stored on interrogation server 24 to identify signal patterns indicating both the beginning of message prompts and the end of message prompts, which prompts are also pre-programmed into server 24. For example, to interrogate a message storage device which uses the prompt "next message" to indicate the beginning of the next message in a queue of stored messages, server 24 will be programmed to recognize the prompts "next" or "next message" as indicating the same. Similarly, to interrogate a message storage device which uses the prompt "end of messages" to indicate the end of a queue of stored messages, server 24 will be programmed to recognize the prompts "end" or "end of messages" as indicating the same.

At step 3, system 10 buffers and downloads the message retrieved from message storage device 12. Buffer server 28 deletes both extraneous leading and trailing prompts and pauses from the message retrieved by interrogation server 24, and MTA server 30 then copies and transfers the edited message to common message storage device 20. Users can then use VUI 32 in conjunction with SPS 26 to listen to or read, edit and/or delete the message.

The present invention retrieves voice-mail and e-mail messages from data network-based message storage device 14 in the same manner that it retrieves voice-mail messages from telephony network-based message storage device 12. The only differences are that interrogation server 24 employs certain conventional Internet protocols such as Post Office Protocol and Internet Mail Access Protocol to retrieve messages from data network-based message storage device 14 and the following data network-based components are utilized instead of the indicated telephony network-based components to which they correspond: a computer 36 is utilized instead of telephone 34; and an Internet gateway 38 is utilized instead of VUI 32. System 10 can be used from any telephone or computer to retrieve messages from telephony network 16 or data network 18.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A system for selectively retrieving a plurality of voice-mail and electronic mail messages from a plurality of telephony network-based and data network-based message storage devices and storing the plurality of retrieved messages on a single common message storage device, comprising:

a server for retrieving and storing the plurality of retrieved messages retrieved from a plurality of telephony network-based and data network-based message storage devices wherein the server uses an energy level detection algorithm, a tone detection algorithm and a speech processing algorithm to communicate with and retrieve those messages of the plurality of retrieved messages from the telephony network-based message storage devices and wherein the energy level detection algorithm, the tone detection algorithm and the speech processing algorithm delete extraneous leading and trailing prompts and pauses from said those messages.

2. The system according to claim 1, wherein the energy level detection algorithm, the tone detection algorithm and the speech processing algorithm identify the beginning and end of each one of said those messages.

3. The system according to claim 1, wherein the server communicates with and retrieves at least one of said those messages via a public switch telephone network.

4. The system according to claim 1, where the server communicates with and retrieves at least one of the plurality of retrieved messages from the data network-based message storage devices via an Internet.

5. The system according to claim 1, wherein the system is programmed to selectively retrieve the plurality of voice-mail and electronic mail messages from the telephony network-based and data network-based message storage devices at a predetermined time.

6. The system according to claim 1, wherein the system is programmed to selectively retrieve the plurality of voice-mail and electronic mail messages from the telephony network-based and data network-based message storage devices at a predetermined frequency.

7. A system for retrieving messages from telephony network-based and data network-based message storage devices and storing the retrieved message on a single message storage device, comprising:

a first server for retrieving a plurality of messages from a telephony network-based message storage device and from a data network-based message storage device;

a second server networked to the first server, the second server storing the plurality of retrieved messages and enabling the plurality of retrieved messages to be accessed, edited and deleted;

a third server networked to the second server, the third server having speech processing algorithms stored thereon which enable the first server to recognize and record human speech to communicate with and retrieve voice messages of the plurality of messages from the telephony network-based message storage devices; and a fourth server networked to the third server, the fourth server deleting both extraneous leading and trailing prompts and pauses from the voice messages retrieved by the first server to create edited messages.

8. The system according to claim 7, further comprising a fifth server networked to the fourth server, the fifth server copying the edited messages and then transferring the edited messages to the second server.

9. The system according to claim 7, wherein the first server uses an energy level detection algorithm, a tone detection algorithm and an automatic speech recognition algorithm stored thereon to communicate with and retrieve the plurality of messages from the telephony network-based and data network-based message storage devices.

10. The system according to claim 9, wherein the energy level detection algorithm, the tone detection algorithm and the automatic speech recognition algorithm identify the beginning and end of each one of the voice messages.

11. The system according to claim 7, wherein the voice messages stored on the second server are listened to, read, edited and deleted by means of a voice user interface.

12. The system according to claim 7, wherein the plurality of messages are retrieved from the telephony network and data network-based message storage devices at a predetermined time.

13. The system according to claim 7, wherein the plurality of messages are retrieved from the telephony network and data network-based message storage devices at a predetermined frequency.

14. The system according to claim 7, wherein at least one of the plurality of messages is a voice-mail message.

15. The system according to claim 7, wherein at least one of the plurality of messages is an electronic mail message.

16. A method for selectively retrieving voice-mail messages from a plurality of telephony network-based message storage devices and electronic mail messages from data network-based message storage devices, comprising the steps of:

using an energy level detection algorithm, a tone detection algorithm and a speech processing algorithm to retrieve and copy the voice-mail messages from the telephony network-based message storage devices and delete extraneous leading and trailing prompts and pauses from the voice-mail messages;

retrieving and copying electronic messages from the data network-based message storage devices; and storing the retrieved and copied voice-mail messages and electronic messages on a single common message storage device from which the retrieved and copied messages can be accessed, edited and deleted.

* * * * *